United States Patent
Lorey (10) Patent No.: US 10,065,533 B2
(45) Date of Patent: Sep. 4, 2018

(54) VEHICLE CAB OR VEHICLE SEAT COMPRISING A HEIGHT-ADJUSTMENT DEVICE

(71) Applicant: GRAMMER AG, Amberg (DE)

(72) Inventor: Alexander Lorey, Maxhutte-Haidhof (DE)

(73) Assignee: GRAMMER AG, Amberg (DE)

(*) Notice: Subject to any disclaimer, the term of this patent is extended or adjusted under 35 U.S.C. 154(b) by 0 days.

(21) Appl. No.: 15/843,351

(22) Filed: Dec. 15, 2017

(65) Prior Publication Data

US 2018/0170216 A1    Jun. 21, 2018

(30) Foreign Application Priority Data

Dec. 16, 2016  (DE) .................. 10 2016 124 696

(51) Int. Cl.
*A47C 1/00* (2006.01)
*B60N 2/16* (2006.01)
(Continued)

(52) U.S. Cl.
CPC .......... *B60N 2/162* (2013.01); *B60N 2/1665* (2013.01); *B60N 2/505* (2013.01); *B60N 2/508* (2013.01); *B60N 2/525* (2013.01); *B62D 33/06* (2013.01)

(58) Field of Classification Search
CPC ........ B60N 2/162; B60N 2/1665; B60N 2/16; B60N 2/04; B60N 2/02; B60N 2/502; B62D 33/06
(Continued)

(56) References Cited

U.S. PATENT DOCUMENTS

| 5,735,509 | A | * | 4/1998 | Gryp | .............. | B60N 2/501 248/550 |
| 8,360,524 | B2 | * | 1/2013 | Deml | .............. | B60N 2/502 248/421 |

(Continued)

FOREIGN PATENT DOCUMENTS

| DE | 10 2005 051 228 B4 | 8/2007 |
| DE | 10 2007 032 897 A1 | 1/2009 |

(Continued)

OTHER PUBLICATIONS

Search Report prepared by the German Patent Office dated Aug. 21, 2017, for German Patent Application No. 10 2016 124 696.4 (English Translation).

(Continued)

*Primary Examiner* — Mark R Wendell
(74) *Attorney, Agent, or Firm* — Sheridan Ross PC (57) ABSTRACT

The invention relates to a vehicle cab or a vehicle seat comprising an upper part and a lower part which are vertically spring-mounted relative to one another by means of at least one height-adjustable scissor-action frame comprising two scissor arms which are pivotable about a common axis, and at least one air spring having a variable air volume, it being possible for movements of the scissor-action frame to be transmitted to a switching element, by means of a transmission element that is mechanically operatively connected to the scissor-action frame, in order to control the air volume of the air spring, wherein a height-adjustment device for the scissor-action frame, comprising a manually actuable control lever element and a guide element that is mechanically operatively connected thereto, the switching element being able to be pivoted about a first axis of rotation and the transmission element being able to be pivoted about the first axis of rotation in the opposite direction to the switching element by means of the guide (Continued)

element, in order to change a neutral position of the switching element that is between two switches provided for controlling an air volume of the air spring.

10 Claims, 8 Drawing Sheets

(51) Int. Cl.
  *B60N 2/50* (2006.01)
  *B60N 2/52* (2006.01)
  *B62D 33/06* (2006.01)

(58) Field of Classification Search
  USPC .............. 297/344.16, 344.15, 344.12, 344.1
  See application file for complete search history.

(56) References Cited

U.S. PATENT DOCUMENTS

| | | | | |
|---|---|---|---|---|
| 8,439,334 B2* | 5/2013 | Deml | ................... | B60N 2/502 248/588 |
| 8,540,316 B2* | 9/2013 | Deml | ................... | B60N 2/502 248/421 |
| 8,820,724 B2* | 9/2014 | Demi | ................... | B60N 2/502 248/588 |
| 9,566,886 B2* | 2/2017 | Lorey | ................... | B60N 2/502 |
| 2004/0159763 A1* | 8/2004 | Mullinix | ................. | B60N 2/501 248/421 |
| 2010/0133413 A1* | 6/2010 | Wahls | ................... | B60N 2/502 248/566 |
| 2012/0025577 A1* | 2/2012 | Kolb | ........................ | B60N 2/38 297/344.13 |
| 2012/0286553 A1* | 11/2012 | Sharda | ................... | B60N 2/688 297/344.15 |
| 2013/0206949 A1* | 8/2013 | Archambault | ......... | B60N 2/525 248/421 |
| 2015/0001771 A1* | 1/2015 | Lorey | .................. | F16F 9/0218 267/126 |
| 2016/0313140 A1* | 10/2016 | Pelka | ..................... | B60N 2/501 |

FOREIGN PATENT DOCUMENTS

| | | |
|---|---|---|
| DE | 10 2010 046 489 B3 | 1/2012 |
| DE | 102014004863 | 10/2015 |
| EP | 2583861 | 4/2013 |
| WO | WO 2016/146 412 A1 | 9/2016 |

OTHER PUBLICATIONS

Extended Search Report for European Patent Application No. 17203460.5, dated Apr. 16, 2018, 3 pages.

* cited by examiner

VEHICLE CAB OR VEHICLE SEAT COMPRISING A HEIGHT-ADJUSTMENT DEVICE

CROSS-REFERENCE TO RELATED APPLICATIONS

This application claims the benefit of German Patent Application No. DE 10 2016 124 696.4 filed Dec. 16, 2016, the entire contents of which are incorporated herein by reference.

FIELD

The invention relates to a vehicle cab or a vehicle seat comprising a height-adjustment device according.

BACKGROUND

Vehicle cabs or vehicle seats, which are used in particular in commercial vehicles, usually have to meet a number of requirements nowadays. In particular, they should provide the vehicle occupant with as much comfort as possible and a high level of individual adjustment options. For this purpose, many commercial vehicle seats are provided, for example between an upper part and a lower part, with a height-adjustable scissor-action frame comprising two scissor arms and pneumatic vertical suspension. The following explanations, however, apply equally to an upper part and a lower part of a vehicle cab.

It is generally known to arrange a compressed-air spring on the scissor-action frame such that said spring is arranged for example either between the two scissor arms or between one of the scissor arms and the lower part, and is supported on the scissor-action frame. Said compressed-air spring can be set with regard to the air volume contained therein. In particular, vibrational movements of the scissor-action frame can be transmitted to a device for setting the air volume, in order to allow the vibrations to decrease.

Automatic weight-adjustment for vehicle seats is known from the prior art, for example from DE 10 2005 051 228 B4 and DE 10 2007 032 897 A1. In this case, the seat moves automatically to an optimal height, for example in the centre of the vibration range, independent of the weight of the driver. Individual adjustment of the seat height is not disclosed here, however.

SUMMARY

The present invention develops the above embodiments. The object of the present invention is therefore to develop a vehicle seat or a vehicle cab which ensure both good vibration damping and also height-adjustment of the vehicle seat.

This object is achieved by a vehicle cab or a vehicle seat comprising an upper part and a lower part which are vertically spring-mounted relative to one another by means of at least one height-adjustable scissor-action frame comprising two scissor arms which are pivotable about a common axis, and at least one air spring having a variable air volume, it being possible for movements of the scissor-action frame to be transmitted to a switching element, by means of a transmission element that is mechanically operatively connected to the scissor-action frame, in order to control the air volume of the air spring, a height-adjustment device for the scissor-action frame, comprising a manually actuable control lever element and a guide element that is mechanically operatively connected thereto, being provided, the switching element being able to be pivoted about a first axis of rotation and the transmission element being able to be pivoted about the first axis of rotation in the opposite direction to the switching element by means of the guide element, in order to change a neutral position of the switching element that is between two switches provided for controlling an air volume of the air spring.

The present invention therefore provides an option for carrying out individual setting of the seat height by means of a height adjustment in the optimal vibration range. In this case, the seat height advantageously remains in the set position, independent of the driver's weight. This is achieved by directly setting the neutral position, using an angularly adjustable unit.

Height adjustment of the vehicle seat is possible because an opposing relative movement between the switching element and the transmission element is possible. For this purpose, the seat occupant, for example, actuates the control lever element for an upwards height adjustment of the vehicle seat, as a result of which the guide element is also moved. Said guide element is advantageously mechanically operatively connected to the switching element and to the transmission element such that opposing movement of the two components is achieved.

In an analogous manner, the transmission element can also remain in its original position and the relative movement can occur between the guide element and the switching element. Specifically, this is no different from the geometry of the relative movements between the switching element, the guide element and the transmission element.

Due to the pivoting of the switching element, said element advantageously assumes a position in which it can actuate one of the switches (in this case the switch for upwards adjustment of the vehicle seat). The air volume of the air spring is therefore changed; in this case, said spring is filled more. The air spring, which is advantageously supported on the scissor-action frame, thus presses against at least one of the scissor arms and deflects said arm about the common axis, such that ends of the scissor arms of the scissor-action frame that oppose one another in the vehicle seat height direction are further away from one another in the present case. The distance between the upper part and the lower part, and therefore the seat height, is thus increased.

The new position of the scissor-action frame is transmitted to the transmission element. Said element rotates in the same direction and transmits the movement to the switching element, which assumes a new neutral position as a result.

Of course, the seat height could also be lowered in an analogous manner to raising said seat height, by the switching element actuating the other of the two switches, by means of which the air volume can be reduced. Air thus escapes from the air spring, whereupon the scissor-action frame moves downwards.

Within the context of the invention, "neutral position of the switching element" is understood to mean an angular position of the switching element that is between a first switching position for actuating the first switch and a second switching position for actuating the second switch. Advantageously, the neutral position of the switching element is arranged exactly centrally between the two switching positions, so that, proceeding from the neutral position for example, movement through the same angle of rotation is required in both directions of rotation, in order to reach one of the two switching positions.

Advantageously, the switching element, the control lever element, the guide element and/or the transmission element are formed in one piece.

In order to ensure mechanical guidance of the mentioned components that is as secure as possible, it has been found to be beneficial, in practice, for the guide element to be pivotably connected to the control lever element via a second axis of rotation that is arranged at a first end of the guide element and is in parallel with the first axis of rotation, and/or to comprise, at a second end, a first and second slot nut element that extend in the direction of the second axis of rotation.

The guide element is thus mounted eccentrically relative to the first axis of rotation, which can also be referred to as the main axis of rotation. The first end of the guide element can thus describe a circular arc portion when the control lever element is actuated. It is thus advantageously possible to determine the amount of relative movement between the guide element and the switching element from the radius of said circular arc portion, which corresponds to the distance between the first and the second axis of rotation and can thus be predetermined, and from the length of said circular arc portion, which can be determined from the pivot path of the control lever element.

At the same time, it is advantageous for the first slot nut element to be able to be guided in a first curved slot of the transmission element, and for the second slot nut element to be able to be guided in a second curved slot of the switching element, a curvature of the first slot being in the opposite direction to a curvature of the second slot.

This embodiment provides secure mechanical guidance between the guide element and the transmission element and switching element. At the same time, it is ensured, for example, that the relative movement can be controlled by the shape and the length of the slot. Thus, a curved slot as described ensures a purely rotational movement of the transmission element and of the switching element.

At the same time, the curved slot of the transmission element and/or of the switching element can for example be in the shape of a circular arc portion, a defined angle being formed between a first and a second end point of the circular arc portion, which end points are the slot ends. This angle has a value from a range of from 5 to 15° for example. In this case, the slot thus comprises a limiting device for the movement of the slot nut elements, by means of the slot ends of said slot.

In order to be able to transmit a transmission of the movements or vibrations of the scissor-action frame to the transmission element and thus to the switching element as efficient as possible, it is advantageous for a coupling rod element to be mechanically operatively connected to one of the scissor arms of the scissor-action frame at a first end and/or to the transmission element at a second end, by means of a torsion spring element. It has been found to be advantageous in this case for a ratio between a movement of the scissor arm and a movement of the coupling rod element to correspond to a transmission ratio of from 1 to 11. According to a preferred variant, the torsion spring element can be formed as a leg spring element.

The torsion spring element is connected to the coupling rod element at a first end and to the transmission element at a second end. The central axis of said spring element is preferably aligned with the first axis of rotation. Said spring element ensures that a torque is passed from the scissor arm to the transmission element by means of the coupling rod element. In addition, the movement of the first end of the torsion spring element, and the energy thus input, is stored inside the torsion spring element as rotational energy at least in part. A suitable design of the torsion spring element thus makes it possible to prevent overloading of the components involved.

According to an advantageous embodiment of the transmission element, a first end of the transmission element comprises a slot portion comprising the first slot, and/or a second end of said transmission element comprises an externally toothed portion that can be mechanically operatively connected to a gear of a brake unit, and a portion for mounting an end of the torsion spring element, a substantially hollow cylindrical portion being arranged between the two ends of the transmission element, which portion can be arranged concentrically to the first axis of rotation.

The brake unit serves for the purpose that small vibrations of the scissor-action frame are braked and are not transmitted to the switching element. Whether a vibration is considered to be small advantageously depends in particular not on the amplitude thereof but rather on the vibration period thereof. In this case, for example the following applies: in the case of a vibration period that is below a specified threshold value, the vibration is not transmitted but instead the vibration is slowed by the brake unit.

In order that the seat occupant can use the height-adjustment device as comfortably as possible, it has been found in practice to be advantageous for the control lever element to be arranged on a front face of the upper part and to be manually pivotable about the first axis of rotation. Said front face corresponds, for example, to a region of the seat part that is central in the vehicle seat width direction and is below a seat part cushion portion of the seat part in the vehicle seat height direction. This region is arranged between the knees of the seat occupant, for example.

According to an advantageous embodiment of the control lever element, the control lever element is substantially in the shape of a segment of a bowl-shaped hollow cylinder having opposing end face portions, it being possible for a hole to be arranged in the end face portions, concentrically to the first axis of rotation, in each case, and/or a gripping element that is perpendicular to the first axis of rotation is arranged on an outer face of the control lever element. The segment of the hollow cylinder advantageously extends over a region of from 135° to 165°, preferably more than 150°, with respect to the central axis thereof.

The embodiment described ensures a very simple and cost-effective embodiment of the control lever element, since said element is bowl-shaped and therefore reproduces the shape of a segment of a bowl-shaped hollow cylinder with respect to the dimensions thereof, but has only a small wall thickness that is advantageously as constant as possible.

At the same time, attaching the gripping element to the cylindrical surface of the segment ensures as favourable as possible an introduction of force when the control lever element is actuated, which reduces the likelihood of failure of the control lever element, for example due to the gripping element being broken off.

According to an advantageous embodiment of the switching element, proceeding from the neutral position of the switching element, the first switch can be actuated, in order to actuate an air supply device of the air spring, by means of a pivoting movement of the switching element in a first direction about the first axis of rotation, and the second switch can be actuated, in order to actuate an air discharge device of the air spring, by means of a pivoting movement of the switching element in a second direction about the first axis of rotation.

For example, the air supply device comprises a compressor and/or the air discharge device comprises an outlet valve. Of course, signal lines and/or drives could also be provided.

Preferably at least one of the switches, preferably both, is/are formed as a pressure switch, i.e. a pressure exerted on an actuation element of the switch is transferred into a movement of the actuation element from a first to a second position. This change in position closes an electrical circuit which is assigned either to the air supply device or to the air discharge device. When the pressure has ceased to be exerted, the actuation element returns to the first position, for example in a spring-assisted manner, as a result of which the electrical circuit is opened again.

Pneumatic, electrical and/or mechanical actuation variants are also conceivable. The use of electric valves is also conceivable, for example.

It is furthermore advantageous for the first switch to be actuable by means of a first switching surface of the switching element and for the second switch to be actuable by means of a second switching surface of the switching element, a slot portion comprising the second slot being arranged at a second end of the switching element, a substantially hollow-cylindrical portion being arranged between the second end and a first end of the switching element, which portion can be arranged concentrically to the first axis of rotation, and/or the first switching surface extending between the first and the second end of the switching element, and the second switching surface extending, at the first end, perpendicularly to a plane in which the second slot extends.

Advantageously, the cylindrical portion of the switching element is arranged between the end face portions of the control lever element. This ensures a design of the arrangement that is as compact as possible.

Since the two switching surfaces are arranged on just one element, undesired displacement between the positions of the two switching surfaces is largely reduced. The arrangement of the slot portion comprising the second slot relative to the second switching surface also increases the compactness of the arrangement.

Advantageously at least one of the switches, preferably both switches, is/are arranged such that the switching element is in contact, in the neutral position thereof, at least with the actuation element of the switch, but without already actuating said element. Advantageously, just slight pivoting of the switching element, for example about an angle in a range of from 0.5° to 2°, then causes actuation of the actuation element and/or of the switch.

It has been found to be beneficial, in practice, to design the arrangement such that the gripping element can be pivoted about the axis of rotation by an angle of +/−25° and/or that the height-adjustment device can adjust the height of the scissor-action frame by at most +/−20 mm.

This ensures that the seat occupant only has to trigger a simple and short pivoting movement. Equally, the control lever element can be integrated in the vehicle seat such that the central axes of the holes of the end face portions are arranged on an outer face of the seat and thus contribute as little as possible to widening of the outer contour of the seat.

Advantageously, a rod-like shaft is arranged between the holes in the end face, or the hollow cylindrical portions of the switching element and/or of the transmission element, which shaft can be aligned with the first axis of rotation or forms said axis.

Advantageous embodiments can be found in the dependent claims.

BRIEF DESCRIPTION OF THE DRAWINGS

Advantages and expediencies can be found in the following description in conjunction with the drawings, in which.

DETAILED DESCRIPTION

Figure 1A:
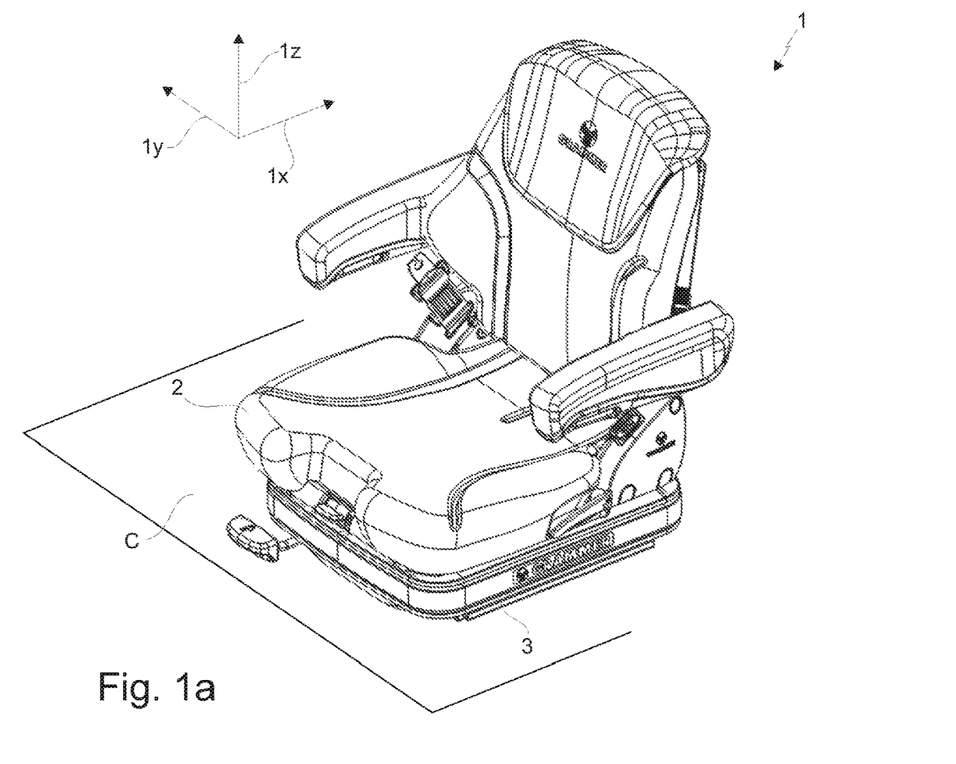
FIGS. 1a and 1b show a vehicle seat according to the invention.

FIG. 1a is a perspective view of a vehicle seat 1 according to the invention (and indicating a vehicle cab C), having a vehicle seat length direction 1x, a vehicle seat width direction 1y and a vehicle seat height direction 1z. Said seat comprises an upper part 2 and a lower part 3 which, in the present case, are spring-mounted relative to one another by means of two height-adjustable scissor-action frames 4 (see FIG. 2). Said scissor-action frames 4 oppose one another in the vehicle seat width direction 1y, such that one scissor-action frame 4 is arranged in each case on the left-hand side and on the right-hand side of the vehicle seat 1.

It should be noted that the following description relates to a vehicle seat 1 and to the upper part 2 and lower part 3 thereof. Analogously thereto, it would also be conceivable for a driver's cab C comprising an upper part and a lower part to be described.

Figure 5A:
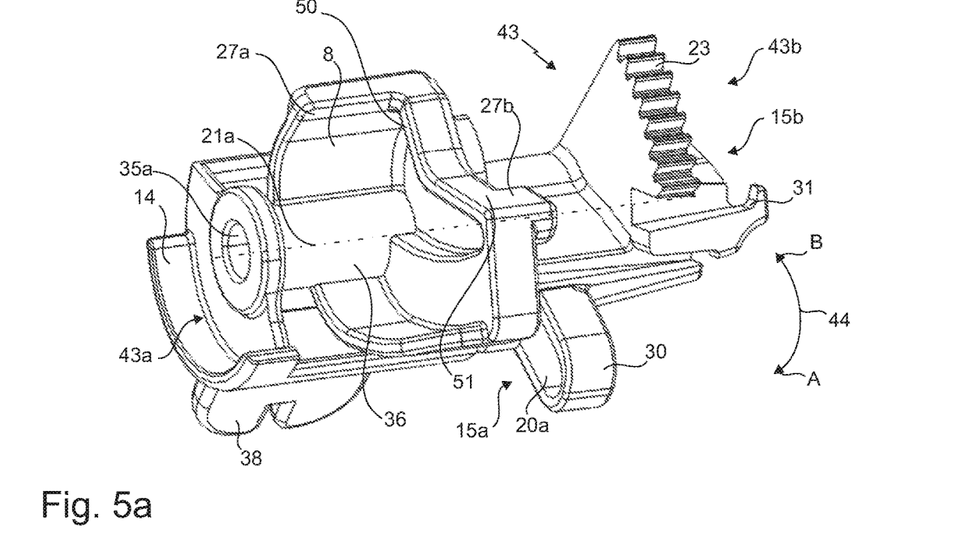
FIG. 5a-5c are different views of a module of the height-adjustment device.
Figure 5B:
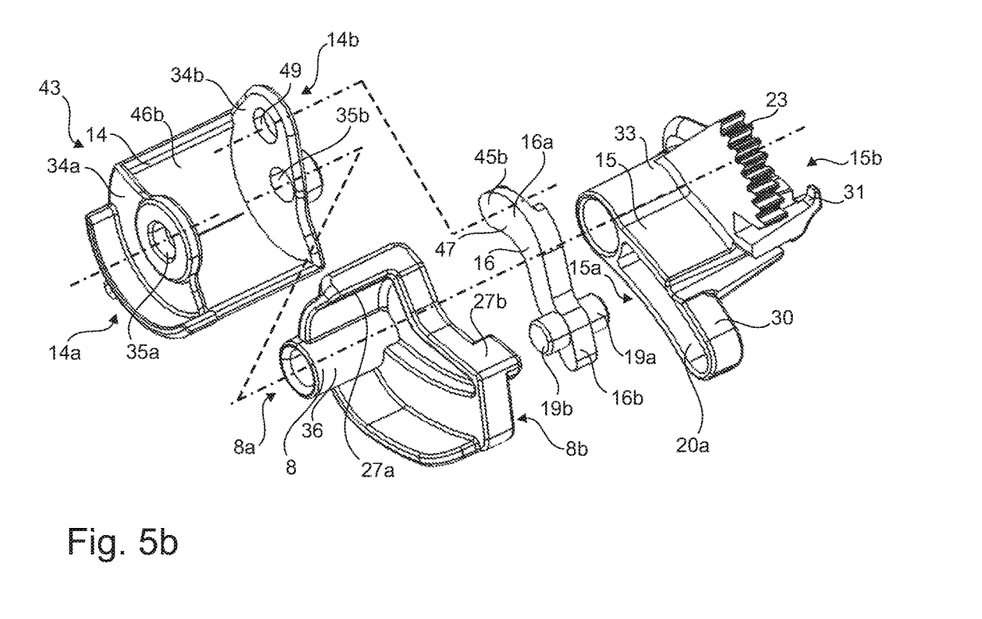
Figure 5C:
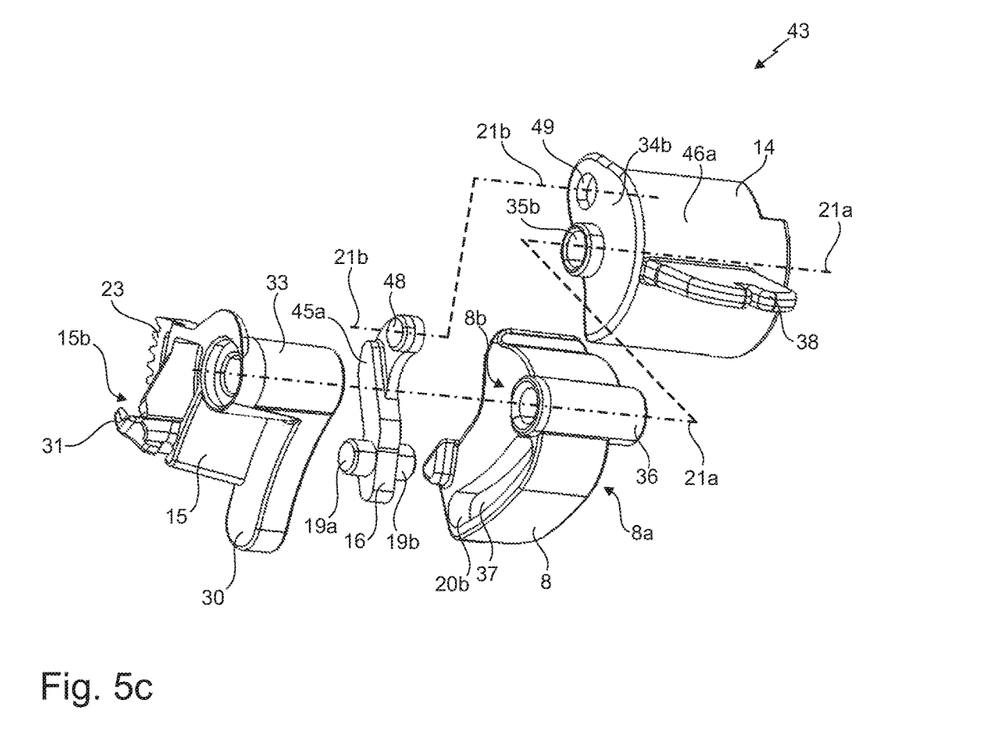

The vehicle seat 1 is characterized by a height-adjustment device 17 for the scissor-action frame 4, comprising a manually actuable control lever element 14 and a guide element 16 that is mechanically operatively connected thereto (see FIGS. 5b and 5c). The control lever element 14 is arranged on a front face 22 of the upper part 2 of the vehicle seat 1 and can be manually pivoted about the first axis of rotation 21a (see FIG. 5a).

Figure 1B:
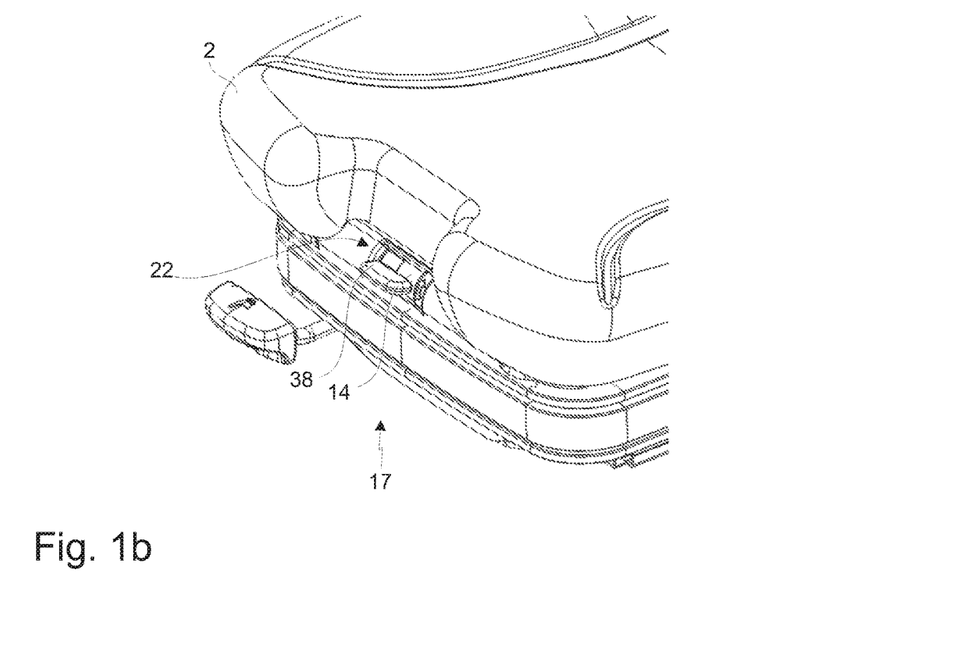

In the present case, according to FIG. 1b a gripping element 38 of the control lever element 14 can be seen, which gripping element is pivotable about the first axis of rotation 21a (see FIG. 5a) by an angle of +/−25°. In the present case, the vehicle seat 1 shown and the height-adjustment device 17 shown can adjust the height of the scissor-action frame 4 by at most +/−20 mm.

Figure 2:
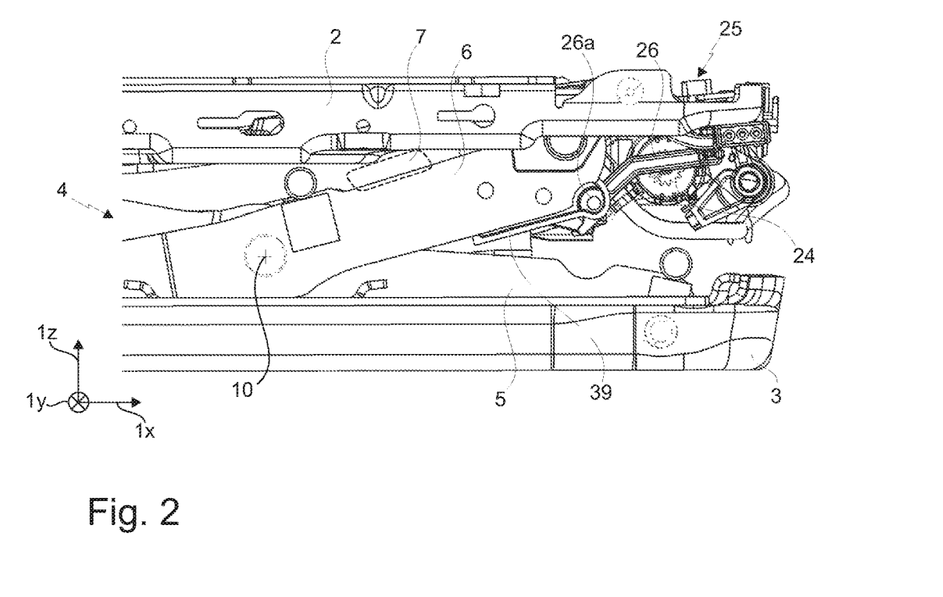
FIG. 2 is a detail of a side view of the vehicle seat according to the invention.

FIG. 2 is a side view of the vehicle seat 1, according to which the two scissor arms 5, 6 of the one scissor-action frame 4, which arms can be pivoted about a common axis 10, can be seen on the right-hand side of the vehicle seat 1. The position of an air spring 7 that has a variable air volume, which air spring is arranged in the present case between the upper part 2 and the scissor arm 6, and by means of which the upper part 2 and the lower part 3 are vertically spring-mounted, is also indicated.

FIG. 2 further shows a coupling rod element 26, a first end 26a of which is mechanically connected to one 6 of the scissor arms 5, 6 of the scissor-action frame 4. In the present case, the first end 26a is connected to the scissor arm 6 by means of a lever element 39 such that the coupling rod element 26 is mounted so as not to rotate relative to the lever element 39. The lever element 39 is advantageously also mounted so as not to rotate relative to the scissor arm 6.

A gear 24 of a brake unit 25 can also be seen, which gear, as will be explained in greater detail in the following, can be operatively connected to a transmission element 15.

FIGS. 3a to 3h show a higher-level module 40 and at least some of the components thereof, consisting of the control lever element 14, coupling rod element 26, transmission element 15, guide element 16, switching element 8, first switch 9a, second switch 9b and torsion spring element 29 (designed as a leg spring element in the present case).

In the present case, the second end 26b (see FIG. 3a) of the coupling rod element 26 is mechanically operatively connected to the transmission element 15 by means of the torsion spring element 29. For this purpose, the second end 26b comprises a hole and is pivotably mounted on the shaft 41 (see FIG. 4) and/or about the first axis of rotation 21a.

Figure 3A:
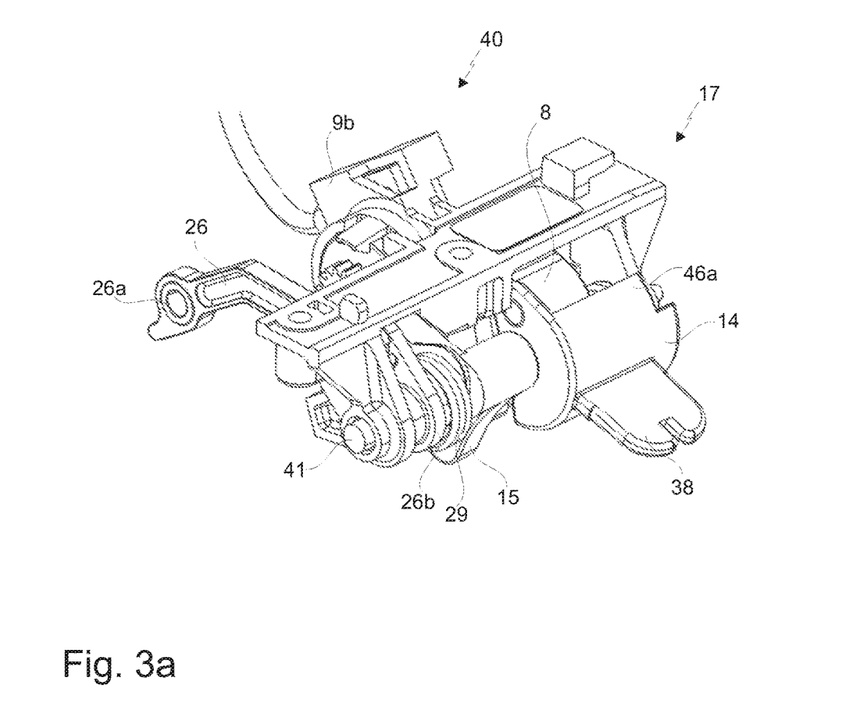
FIG. 3a-3h are different views of the height-adjustment device of the vehicle seat according to the invention.
Figure 3B:
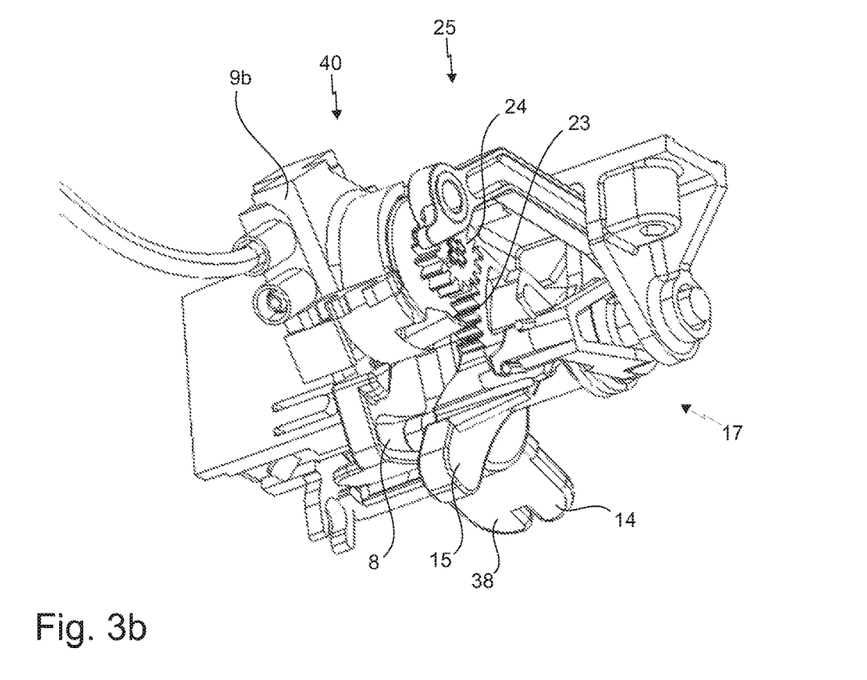
Figure 3C:
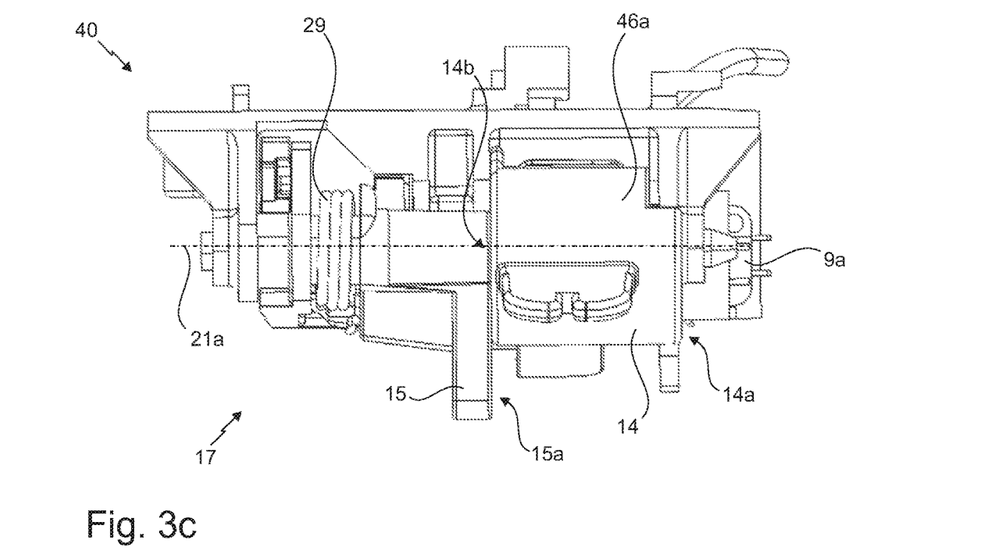
Figure 3D:
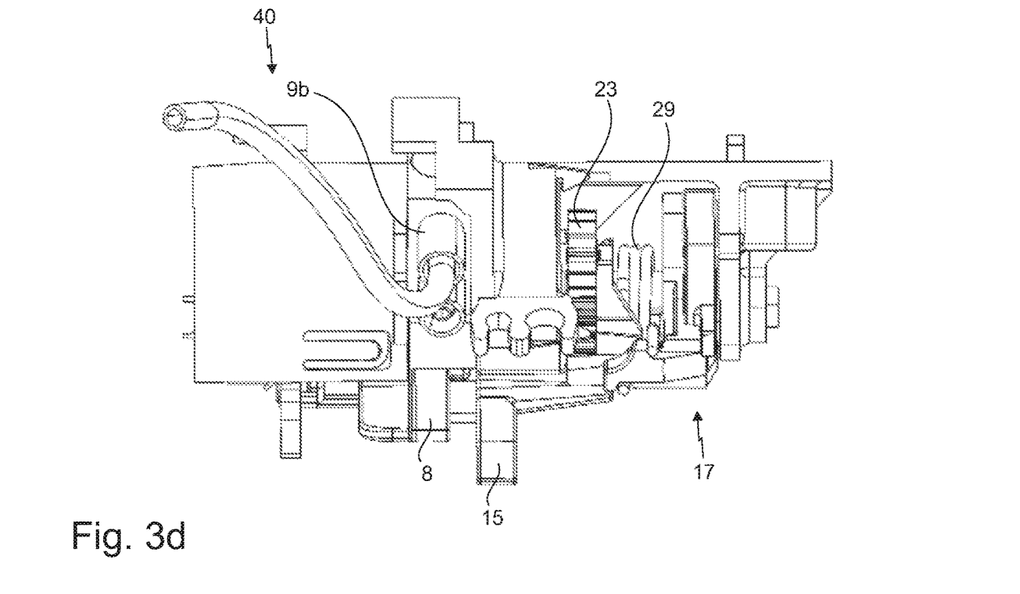
Figure 3E:
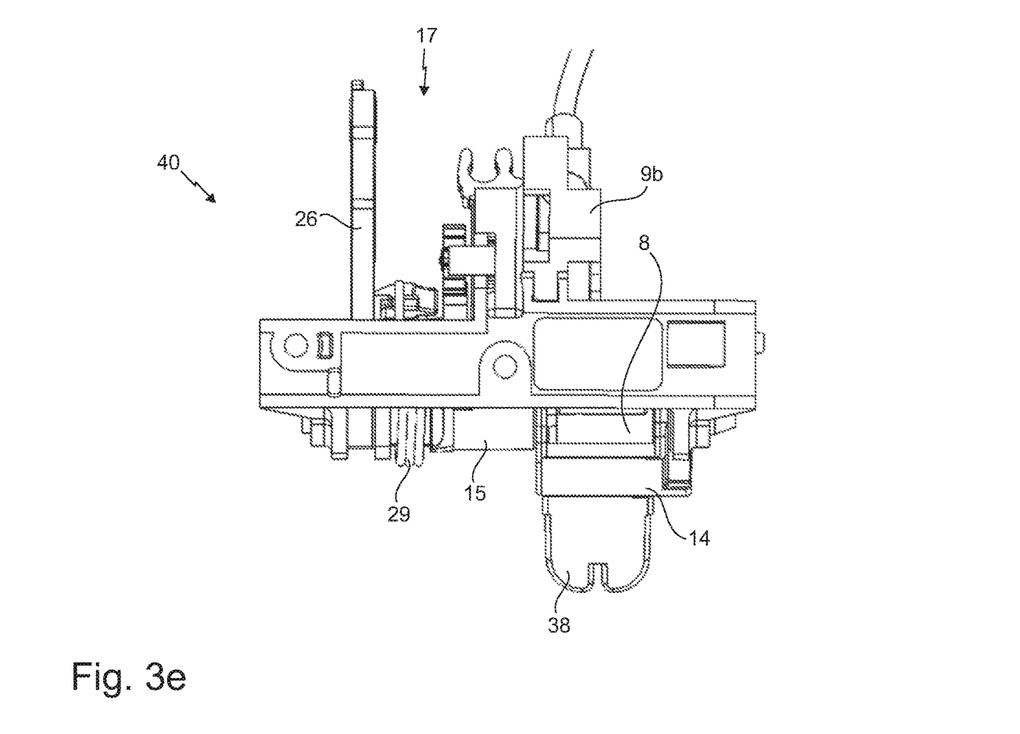
Figure 3F:
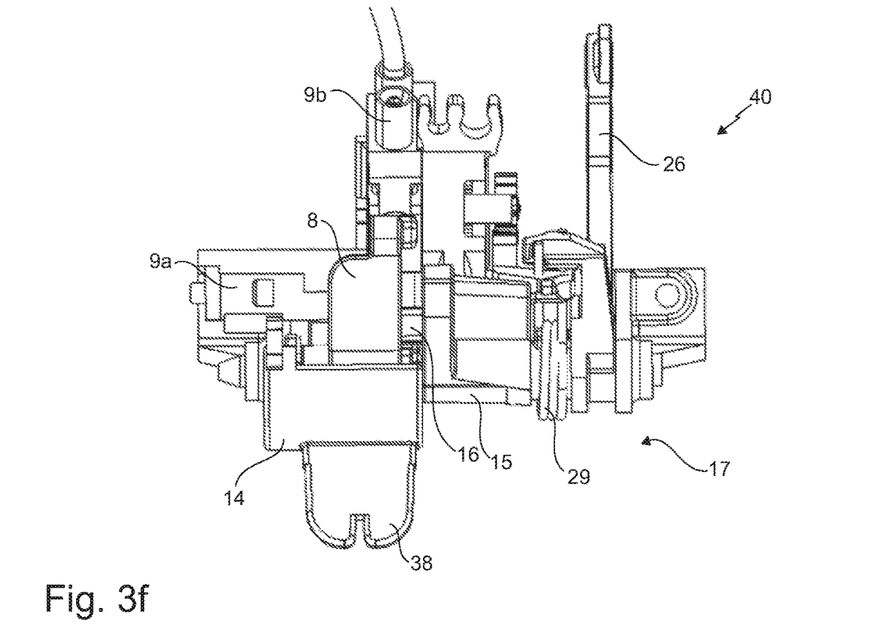
Figure 3G:
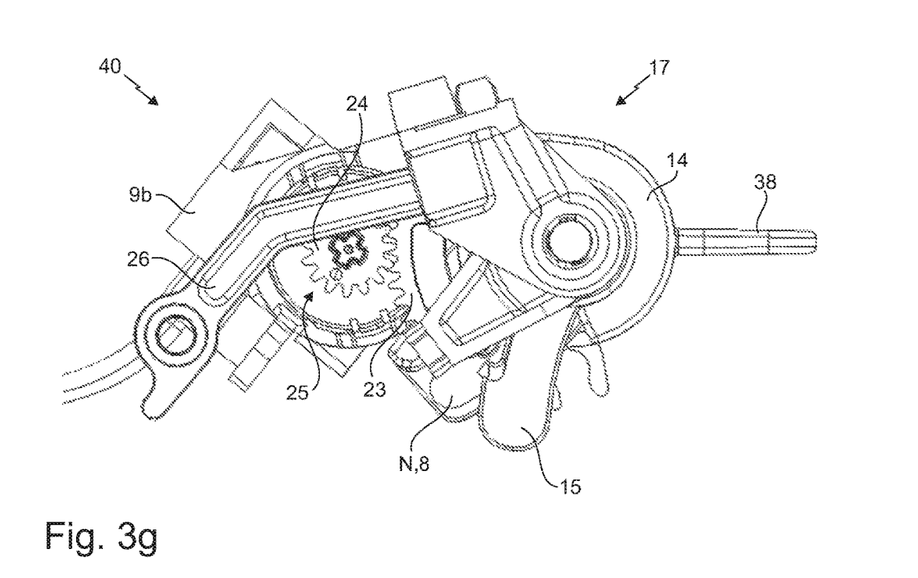

FIGS. 3b, 3c and 3g show in particular that a second end 15b of the transmission element 15 comprises an externally toothed portion 23 that can be mechanically operatively connected to the gear 24 of the brake unit 25.

Movements of the scissor-action frame 4 can be transmitted to the shown switching element 8 by means of the transmission element 15 that is mechanically operatively connected to the scissor-action frame 4, in order to control the air volume of the air spring 7.

Figure 3H:
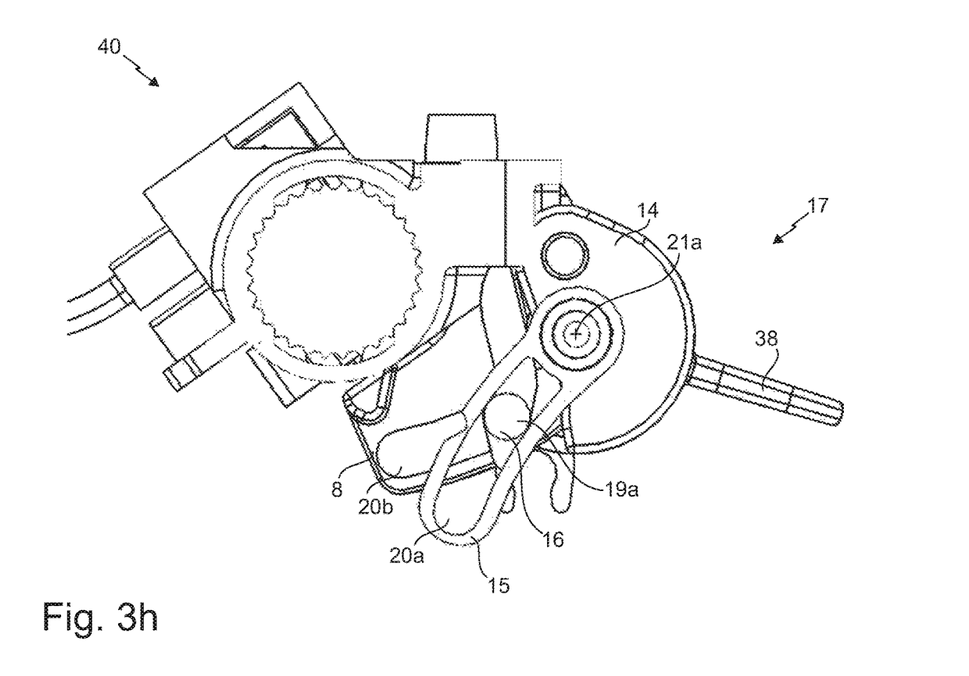

FIG. 3h shows the arrangement of the guide element 16 by means of which the switching element 8 can be pivoted about the first axis of rotation 21a and by means of which the transmission element 15 can be pivoted about the first axis of rotation 21a in the opposite direction to the switching element 8, in order to change a neutral position N of the switching element 8 (see FIG. 3g) that is between two switches 9a, 9b provided for controlling an air volume of the air spring 7. In this drawing according to FIG. 3h, the control lever element 14 is deflected downwards.

Figure 4:
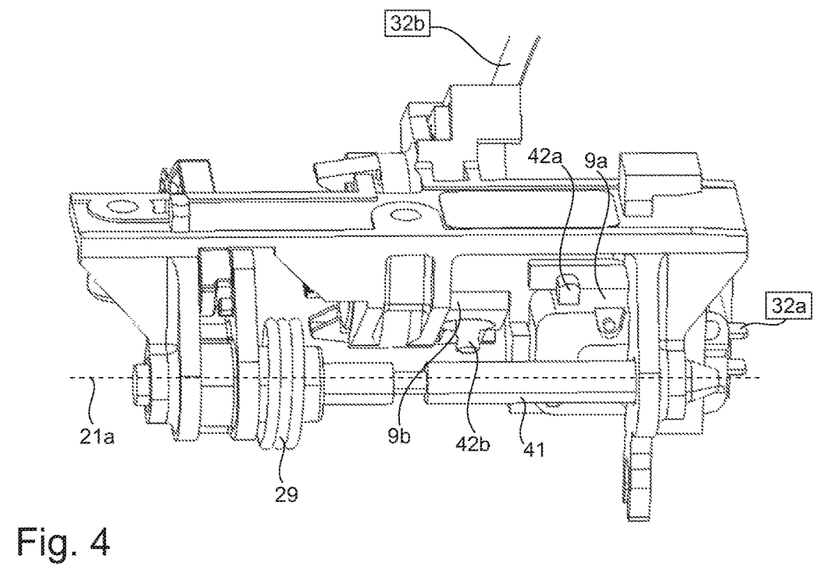
FIG. 4 is a simplified view of the height-adjustment device of the vehicle seat according to the invention.

For reasons of clarity, FIG. 4 shows the module 40 without the switching element 8, transmission element 15, guide element 16 and control lever element 14, and therefore a rod-shaped shaft 41 that is arranged between the holes 35a, 35b (see FIG. 5b, 5c) of the end face portions 34a, 34b, or between the hollow cylindrical portions 36, 33 (see FIG. 5b, 5c) of the switching element 14 and/or of the transmission element 15, is visible, which shaft is formed as the first axis of rotation 21a in this case. The transmission element 15 is preferably rotatably connected to said shaft 41. In contrast, the shaft 41 is preferably arranged so as to be rigid relative to the transmission element 15 with regard to displacement in the direction of the shaft 41.

The switches 9a, 9b and the actuation elements 42a, 42b thereof can also be seen in this view.

FIG. 5a to 5c show a module 43 that is formed of the switching element 8, the control lever element 14, the transmission element 15 and the guide element 16. The rod-shaped shaft 41 is not shown.

The overall module 43 is very compact, in particular because the hollow cylindrical portion 36 of the switching element 8 is arranged fully between the two end face portions 34a, 34b of the control lever element 14 (see FIG. 5a, FIG. 3c and FIG. 3e).

Aside from the ends of the rod-shaped shaft 41 (not shown), the first end 43a of the module 43 is formed by the control lever element 14. Aside from the ends of the rod-shaped shaft 41 (not shown), the second end 43b of the module 43 that is averted from the first end 43a in the direction of the first axis of rotation 21a, is formed by the transmission element 15.

With respect to a direction of the first axis of rotation 21a, the second end 14b of the control lever element 14 is aligned with the second end 8b of the switching element 8 and with a surface 45a of the guide element 16 that is perpendicular to the axis of rotation 21a, on which surface the first slot nut element 19a is arranged. In the present case, the second slot nut element 19b is arranged on a surface 45b that is opposite the surface 45a of the guide element 16 and that is also perpendicular to the axis of rotation 21a.

In the present case, the guide element 16 is pivotably connected to the control lever element 14 by means of a second axis of rotation 21b that is arranged at a first end 16a of the guide element 16 and is in parallel with the first axis of rotation 21a (see FIGS. 5b and 5c).

An extension 47 of the surface 45b of the guide element 16 (see FIG. 5b) simultaneously forms a platform, on which a circular elevation 48 is arranged (see FIG. 5c). Said elevation is designed to be arranged in a hole 49 on the end face portion 34b of the control lever element 14. For this purpose, the circular elevation 48 is introduced into the hole 49 from the inner face of the control lever element 14 (which faces the inside lateral surface 46b and is shown in FIG. 5b).

In this case, both a central axis of the hole 49 and a central axis of the elevation 48 are aligned with the second axis of rotation 21b.

In the present case, the second end 14b of the control lever element 14 is directly adjacent to the first end 15a of the transmission element 15 (see FIG. 3c).

A second end 16b of the guide element 16 comprises a first 19a and second slot nut element 19b that each extend in the direction of the second axis of rotation 21b and thus in the direction of the first axis of rotation 21a.

In this case, the first slot nut element 19a can be guided in a first curved slot 20a of the transmission element 15. The second slot nut element 19b can be guided in a second curved slot 20b of the switching element 8. The slot nut elements 19a, 19b are preferably arranged inside the slots 20a, 20b over the entire extent of said elements in the direction of the second axis of rotation 21b, which further increases the compactness and the mechanical stability of the arrangement.

In this case, a curvature of the first slot 20a is in the opposite direction to a curvature of the second slot 20b. This is shown for example on the basis of the view in FIG. 3g, according to which the first slot 20a has a course to the right and the second slot 20b has a course to the left, proceeding from the first slot nut element 19a.

A first end 15a of the transmission element 15 comprises a slot portion 30 comprising the outwardly facing first slot 20a. An externally toothed portion 23 that can be mechanically operatively connected to the gear 24 of the brake unit 25 is arranged at a second end 15b of the transmission element 15. A portion 31 for mounting an end of the torsion spring element 29 is furthermore provided.

A substantially hollow cylindrical portion 33 is arranged between the two ends 15a, 15b of the transmission element 15, which portion can be arranged concentrically to the first axis of rotation 21a.

The control lever element 14 is substantially in the shape of a segment of a bowl-shaped hollow cylinder comprising opposing end face portions 34a, 34b on the first 14a and/or second end 14b. In this case, each hole 35a, 35b in the end face portions 34a, 34b can be arranged concentrically to the first axis of rotation 21a.

A gripping element 38, the planar extent of which is perpendicular to the first axis of rotation 21a, is arranged on an outer face of the control lever element 14, in this case on an outer lateral surface 46a of the hollow cylinder. Preferably, the extent of the outer lateral surface 46a in the direction of the first axis of rotation 21a is limited, at the second end 14b of the control lever element 14, by the end face portion 34b. More preferably, the extent of the outer lateral surface 46a in the direction of the first axis of rotation 21a is not limited, at the first end 14a of the control lever element 14, by the end face portion 34a, but instead extends on both sides of the end face portion 34a.

FIG. 5b also shows the inner lateral surface 46b which, in the present case, results from the bowl shape of the control lever element 14.

A double arrow 44 having directions A and B shows the directions in which the switching element 8 can be pivoted in order to actuate the switches 9a, 9b.

Proceeding from a neutral position N of the switching element 8 shown in FIG. 3g, the first switch 9a can be actuated, in order to actuate an air supply device 32a (see FIG. 4) of the air spring 7, by means of a pivoting movement of the switching element 8 in a first direction A about the first axis of rotation 21a.

Analogously thereto, proceeding from the neutral position N of the switching element 8, the second switch 9b can be actuated, in order to actuate an air discharge device 32b (see FIG. 4) of the air spring 7, by means of a pivoting movement of the switching element 8 in a second direction B about the first axis of rotation 21a.

The position of a first 27a and a second switching surface 27b of the switching element 8 can be seen in particular in FIG. 5a. The first switch 9a, in particular the actuation element 42a thereof, can be actuated by means of the first switching surface 27a, and the second switch 9b, in particular the actuation element 42b thereof, can be actuated by means of the second switching surface 27b.

A slot portion 28 comprising the outwardly facing second slot 20b is arranged at a second end 8b of the switching element 8. A substantially cylindrical portion 36 of the switching element 8 is arranged between the second end 8b and a first end 8a of the switching element 8, which portion can be arranged concentrically to the first axis of rotation 21a.

In this case, the first switching surface 27a extends from the first end 8a of the switching element 8. Pointing in the direction of the second end 8b of the switching element 8, the first switching surface 27a is limited by a shoulder 50 (see FIG. 5a).

The second switching surface 27b is arranged on the second end 8b and extends perpendicularly to a plane 37 in which the second slot 20b extends. In this case, the second switching surface 27b is formed by a widened surface 51 which is limited by the shoulder 50 on the side facing the first end 8a.

All the features disclosed in the application documents are claimed as being essential to the invention provided that, individually or in combination, they are novel over the prior art.

LIST OF REFERENCE SIGNS 1 vehicle seat
1x length direction
1y width direction
1z height direction
2 upper part
3 lower part
4 scissor-action frame
5, 6 scissor arm
7 air spring
8 switching element
8a, 8b end
9a, 9b switch
10 shaft
14 control lever element
14a, 14b end
15 transmission element
15a, 15b end
16 guide element
16a, 16b end
17 height-adjustment device
19a, 19b slot nut element
20a, 20b slot
21a, 21b axis of rotation
22 edge
23 portion
24 gear
25 brake unit
26 coupling rod element
26a, 26b end
27a, 27b switching surface
28, 30 slot portion
29 torsion spring element
31, 33, 36 portion
32a air supply device
32b air discharge device
34a, 34b end face portion
35a, 35b hole
37 plane
38 gripping element
39 lever element
40, 43 module
41 shaft
42a, 42b actuation element
44 double arrow
45a, 45b, 51 surface
46a, 46b lateral surface
47 extension
48 elevation
49 hole
50 shoulder
A, B direction
C vehicle cab
N neutral position

The invention claimed is:
1. A vehicle cab or vehicle seat comprising an upper part and a lower part which are vertically spring-mounted relative to one another by means of at least one height-adjustable scissor-action frame comprising two scissor arms which are pivotable about a common axis, and at least one air spring having a variable air volume, it being possible for movements of the scissor-action frame to be transmitted to a switch element, by means of a transmission element that is mechanically and operatively connected to the scissor-action frame, in order to control the air volume of the air spring, wherein
a height-adjustment device for the scissor-action frame, comprising a manually actuatable control lever element and a guide element that is mechanically and operatively connected thereto, the switch element being able to be pivoted about a first axis of rotation and the transmission element being able to be pivoted about the first axis of rotation in the opposite direction to the switch element by means of the guide element, in order to change a neutral position of the switch element that is between two switches provided for controlling an air volume of the air spring.

2. The vehicle cab or vehicle seat according to claim 1, wherein the guide element is pivotably connected to the control lever element by means of a second axis of rotation that is arranged at a first end of the guide element and is in parallel with the first axis of rotation, and comprises, at a second end, first and second slot nut elements that extend in the direction of the second axis of rotation.

3. The vehicle cab or vehicle seat according to claim 2, wherein the first slot nut element can be guided in a first curved slot of the transmission element, and the second slot nut element can be guided in a second curved slot of the switch element, a curvature of the first slot being in the opposite direction to a curvature of the second slot.

4. The vehicle cab or vehicle seat according to claim 1, wherein a coupling rod element is mechanically and operatively connected, at a first end, to one of the scissor arms of the scissor-action frame and/or, at a second end, to the transmission element, by means of a torsion spring element.

5. The vehicle cab or vehicle seat according to claim 4, wherein a first end of the transmission element comprises a slot portion comprising a first slot, and/or a second end of said transmission element comprises an externally toothed portion that can be mechanically and operatively connected to a gear of a brake unit, and a portion for mounting an end of the torsion spring element, a substantially hollow cylindrical portion being arranged between the two ends of the transmission element, which portion can be arranged concentrically to the first axis of rotation.

6. The vehicle cab or vehicle seat according to claim 1, wherein the control lever element is arranged on a front face of the upper part of the vehicle seat or of the vehicle cab and can be manually pivoted about the first axis of rotation.

7. The vehicle cab or vehicle seat according to claim 1, wherein the control lever element is substantially in the shape of a segment of a bowl-shaped hollow cylinder having opposing end face portions, it being possible for a hole to be arranged in the end face portions, concentrically to the first axis of rotation, respectively, and/or in that a gripping element that is perpendicular to the first axis of rotation is arranged on an outer face of the control lever element.

8. The vehicle cab or vehicle seat according to claim 7, wherein the gripping element can be pivoted about the first axis of rotation by an angle of +/−25° and/or the height-adjustment device can adjust the height of the scissor-action frame by at most +/−20 mm.

9. The vehicle cab or vehicle seat according to claim 1, wherein proceeding from the neutral position of the switch element, the first switch can be actuated, in order to actuate an air supply device of the air spring, by means of a pivoting movement of the switch element in a first direction about the first axis of rotation, and the second switch can be actuated, in order to actuate an air discharge device of the air spring, by means of a pivoting movement of the switch element in a second direction about the first axis of rotation.

10. The vehicle cab or vehicle seat according to claim 1, wherein the first switch can be actuated by means of a first switching surface of the switch element, and the second switch can be actuated by means of a second switching surface of the switch element, a slot portion comprising a second slot being arranged at a second end of the switch element and a substantially cylindrical portion being arranged between the second end and a first end of the switch element, which portion can be arranged concentrically to the first axis of rotation, and/or the first switching surface extending between the first and the second end of the switch element, and the second switching surface extending, at the first end, perpendicularly to a plane in which the second slot extends.

* * * * *

UNITED STATES PATENT AND TRADEMARK OFFICE
CERTIFICATE OF CORRECTION

| | | |
|---|---|---|
| PATENT NO. | : 10,065,533 B2 | Page 1 of 1 |
| APPLICATION NO. | : 15/843351 | |
| DATED | : September 4, 2018 | |
| INVENTOR(S) | : Alexander Lorey | |

It is certified that error appears in the above-identified patent and that said Letters Patent is hereby corrected as shown below:

On the Title Page

At (72) Inventor, delete "Maxhutte-Haidhof" and insert --Maxhuette-Haidhof--

Signed and Sealed this
Thirtieth Day of April, 2019

Andrei Iancu
*Director of the United States Patent and Trademark Office*